United States Patent
Hsu et al.

(10) Patent No.: US 7,806,546 B2
(45) Date of Patent: *Oct. 5, 2010

(54) OPTICAL PLATE HAVING THREE LAYERS AND BACKLIGHT MODULE WITH SAME

(75) Inventors: Tung-Ming Hsu, Tu-cheng (TW); Shao-Han Chang, Tu-cheng (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 119 days.

This patent is subject to a terminal disclaimer.

(21) Appl. No.: 11/784,426

(22) Filed: Apr. 6, 2007

(65) Prior Publication Data

US 2008/0137370 A1 Jun. 12, 2008

(30) Foreign Application Priority Data

Dec. 8, 2006 (CN) .................... 200610201244

(51) Int. Cl.
*F21V 17/02* (2006.01)
*G09F 13/04* (2006.01)

(52) U.S. Cl. ............ 362/97.2; 362/330; 362/616; 362/620; 362/621; 349/64

(58) Field of Classification Search .......... 362/606, 362/607, 29, 30, 97.1–97.2, 616, 620–621; 359/707; 349/64
See application file for complete search history.

(56) References Cited

U.S. PATENT DOCUMENTS

| | | | |
|---|---|---|---|
| 5,377,084 A | 12/1994 | Kojima et al. | |
| 6,104,854 A | 8/2000 | Masaki et al. | |
| 6,275,338 B1 | 8/2001 | Arai et al. | |
| 6,444,298 B1 | 9/2002 | Tadokoro et al. | |
| 6,827,456 B2 * | 12/2004 | Parker et al. | ............ 362/629 |
| 6,870,674 B2 | 3/2005 | Ookawa et al. | |
| 7,156,547 B2 | 1/2007 | Toshima et al. | |
| 2002/0051356 A1 | 5/2002 | Takahashi et al. | |
| 2004/0160673 A1 | 8/2004 | Se et al. | |
| 2005/0224997 A1 | 10/2005 | Liao et al. | |
| 2007/0014034 A1 * | 1/2007 | Lee et al. | ............ 359/707 |

(Continued)

FOREIGN PATENT DOCUMENTS

CN 1505764 A 6/2004

(Continued)

*Primary Examiner*—Jason Moon Han
*Assistant Examiner*—Sean P Gramling
(74) *Attorney, Agent, or Firm*—Jeffrey T. Knapp (57) ABSTRACT

An exemplary optical plate includes a first transparent layer (21), a second transparent layer (23) and a light diffusion layer (22). The first transparent layer includes an outer surface (210) and a plurality of first conical frustum-shaped depressions (211) defined at the outer surface. The second transparent layer includes an outer surface (230) and a plurality of second conical frustum-shaped depressions (231) defined at the outer surface. The first transparent layer, the light diffusion layer, and the second transparent layer are integrally formed, with the first transparent layer in immediate contact with the light diffusion layer, and the second transparent layer in immediate contact with the light diffusion layer. The light diffusion layer includes a transparent matrix resin (221) and a plurality of diffusion particles (222) dispersed in the transparent matrix resin.

17 Claims, 8 Drawing Sheets

U.S. PATENT DOCUMENTS

| | | |
|---|---|---|
| 2007/0171671 A1* | 7/2007 | Kurokawa et al. .......... 362/606 |
| 2007/0285785 A1* | 12/2007 | Lin ............................ 359/599 |
| 2008/0130112 A1 | 6/2008 | Hsu et al. |
| 2008/0130113 A1 | 6/2008 | Hsu et al. |
| 2008/0130114 A1 | 6/2008 | Hsu et al. |
| 2008/0130115 A1 | 6/2008 | Hsu et al. |
| 2008/0130119 A1 | 6/2008 | Hsu et al. |
| 2008/0130120 A1 | 6/2008 | Hsu et al. |
| 2008/0130279 A1 | 6/2008 | Hsu et al. |
| 2008/0137193 A1 | 6/2008 | Hsu et al. |
| 2008/0137334 A1 | 6/2008 | Hsu et al. |

FOREIGN PATENT DOCUMENTS

| | | |
|---|---|---|
| CN | 1896775 A | 1/2007 |
| EP | 2006/109818 A1 | 10/2006 |
| TW | I252344 * | 4/2006 |

* cited by examiner

OPTICAL PLATE HAVING THREE LAYERS AND BACKLIGHT MODULE WITH SAME

CROSS-REFERENCE TO RELATED APPLICATIONS

This application is related to nine co-pending U.S. patent applications, application Ser. No. 11/620,951 filed on Jan. 8, 2007, and entitled "OPTICAL PLATE HAVING THREE LAYERS", application Ser. No. 11/620,958, filed on Jan. 8, 2007, and entitled "OPTICAL PLATE HAVING THREE LAYERS AND MICRO PROTRUSIONS", application Ser. No. 11/623,302, filed on Jan. 5, 2007, and entitled "OPTICAL PLATE HAVING THREE LAYERS", application Ser. No. 11/623,303, filed on Jan. 15, 2007, and entitled "OPTICAL PLATE HAVING THREE LAYERS AND BACKLIGHT MODULE WITH SAME", application Ser. No. 11/627,579, filed on Jan. 26, 2007, and entitled "OPTICAL PLATE HAVING THREE LAYERS", application Ser. No. 11/784,355, filed on Apr. 6, 2007, and entitled "OPTICAL PLATE HAVING THREE LAYERS AND BACKLIGHT MODULE WITH SAME", application Ser. No. 11/784,419, filed on Apr. 6, 2007, and entitled "OPTICAL PLATE HAVING THREE LAYERS AND BACKLIGHT MODULE WITH SAME", application Ser. No. 11/784,354, filed on Apr. 6, 2007, and entitled "OPTICAL PLATE HAVING THREE LAYERS AND BACKLIGHT MODULE WITH SAME", application Ser. No. 11/784,425,filed on Apr. 6, 2007, and entitled "OPTICAL PLATE HAVING THREE LAYERS AND BACKLIGHT MODULE WITH SAME" wherein the inventor is Tung-Ming Hsu et al. All of such applications have the same assignee as the present application. The disclosures of the above-identified applications are incorporated herein by reference.

BACKGROUND OF THE INVENTION

1. Field of the Invention

The present invention relates to an optical plate for use in, for example, a backlight module, the backlight module typically being employed in a liquid crystal display (LCD).

2. Discussion of the Related Art

The weight and/or the thinness of LCD panels makes them suitable for use in a wide variety of electronic devices such as personal digital assistants (PDAs), mobile phones, portable personal computers, and other electronic appliances. Liquid crystal is a substance that does not emit light. Instead, the liquid crystal relies on light from a light source to display images. In the case of a LCD panel, the light source is a backlight module.

Figure 8:
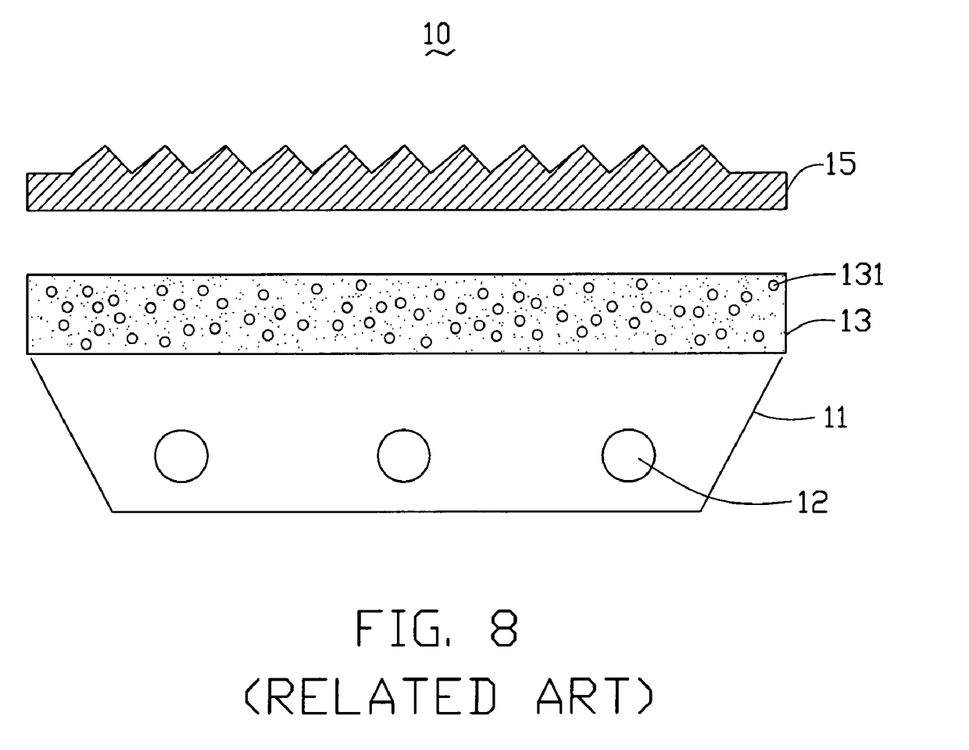
FIG. 8 is an exploded, lateral cross-sectional view of a conventional backlight module.

FIG. 8 is an exploded, lateral cross-sectional view of a typical direct type backlight module 10 employing a typical optical diffusion plate 13. The backlight module 10 includes a housing 11, a plurality of lamps 12 disposed on a base of the housing 11, the light diffusion plate 13, and a prism sheet 15 stacked on a top of the housing 11, respectively. The housing 11 is configured for concentrating the direct and reflected light, of the lamps 12, towards the prism sheet 15. The light diffusion plate 13 includes a plurality of dispersion particles 131. The dispersion particles 131 are configured for scattering the light, and thereby enhancing the uniformity of light exiting the light diffusion plate 13. The front of the prism sheet 15 includes a plurality of V-shaped structures. The V-shaped structures are configured for collimating, to a certain extent, the received light.

In use, light from the lamps 12 enters the prism sheet 15 after being scattered in the light diffusion plate 13. The light are refracted in the prism sheet 15 and collimated by the V-shaped structures, to increase the brightness, and finally onto an LCD panel (not shown) disposed above the prism sheet 15. Although the brightness may be improved by the V-shaped structures, the viewing angle may be narrowed. In addition, because of the manufacturing methodology, a plurality of air pockets are formed between the light diffusion plate 13 and the prism sheet 15. Thus when the backlight module 10 is in use, light passing through the air pockets undergoes total reflection at the air pockets and as a result the brightness is reduced.

Therefore, a new optical means is desired in order to overcome the above-described shortcomings.

SUMMARY

An optical plate includes a first transparent layer, a second transparent layer, and a light diffusion layer. The light diffusion layer is between the first transparent layer and the second transparent layer. The light diffusion layer includes a transparent matrix resin and a plurality of diffusion particles dispersed in the transparent matrix resin. The first transparent layer, the light diffusion layer, and the second transparent layer are integrally formed, with the first transparent layer in immediate contact with the light diffusion layer, and the second transparent layer in immediate contact with the light diffusion layer. The first transparent layer defines a plurality of first conical frustum-shaped depressions at an outer surface that is distalmost from the light diffusion layer. The second transparent layer defines a plurality of second conical frustum-shaped depressions at an outer surface that is distalmost from the light diffusion layer.

Other novel features and advantages will become more apparent from the following detailed description, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical plate and backlight module. Moreover, in the drawings, like reference numerals designate corresponding parts throughout the several views, and all the views are schematic.

DETAILED DESCRIPTION OF THE EMBODIMENTS

Reference will now be made to the drawings to describe preferred embodiments of the present optical plate and backlight module, in detail.

Figure 1:
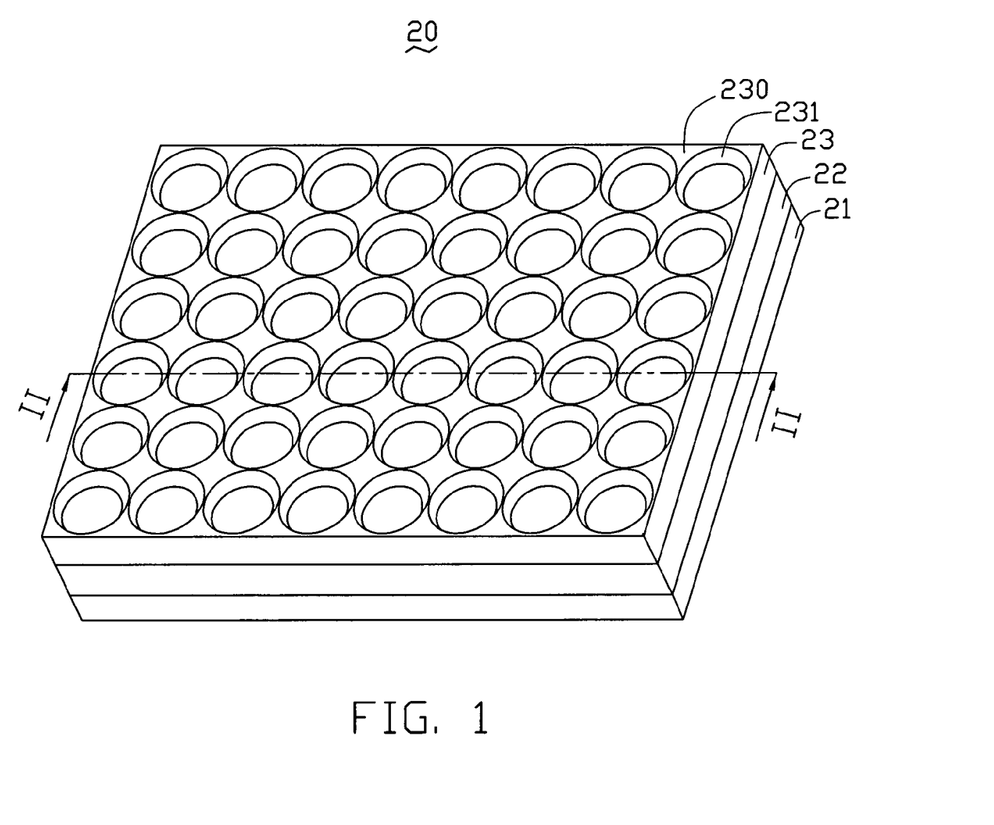
FIG. 1 is an isometric view of an optical plate in accordance with a first preferred embodiment of the present invention.
Figure 2:
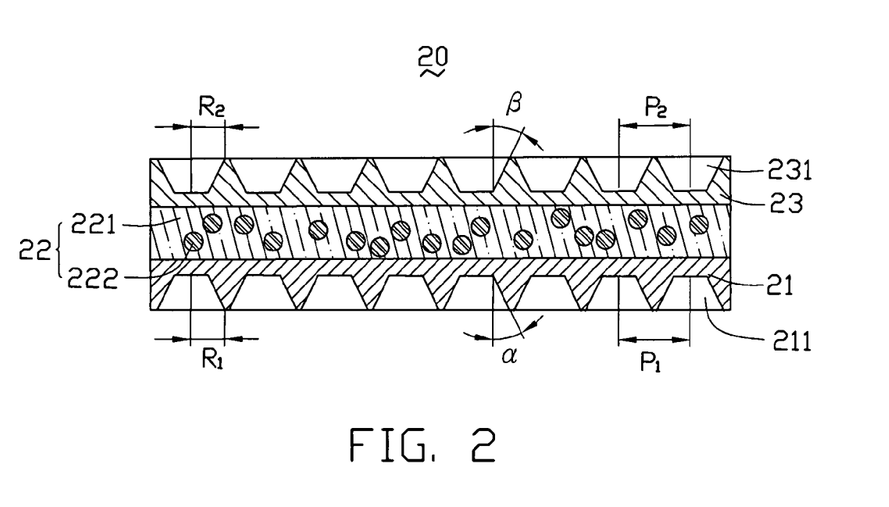
FIG. 2 is a lateral cross-sectional, partially enlarged view of the optical plate of FIG. 1, taken along line II-II thereof.
Figure 3:
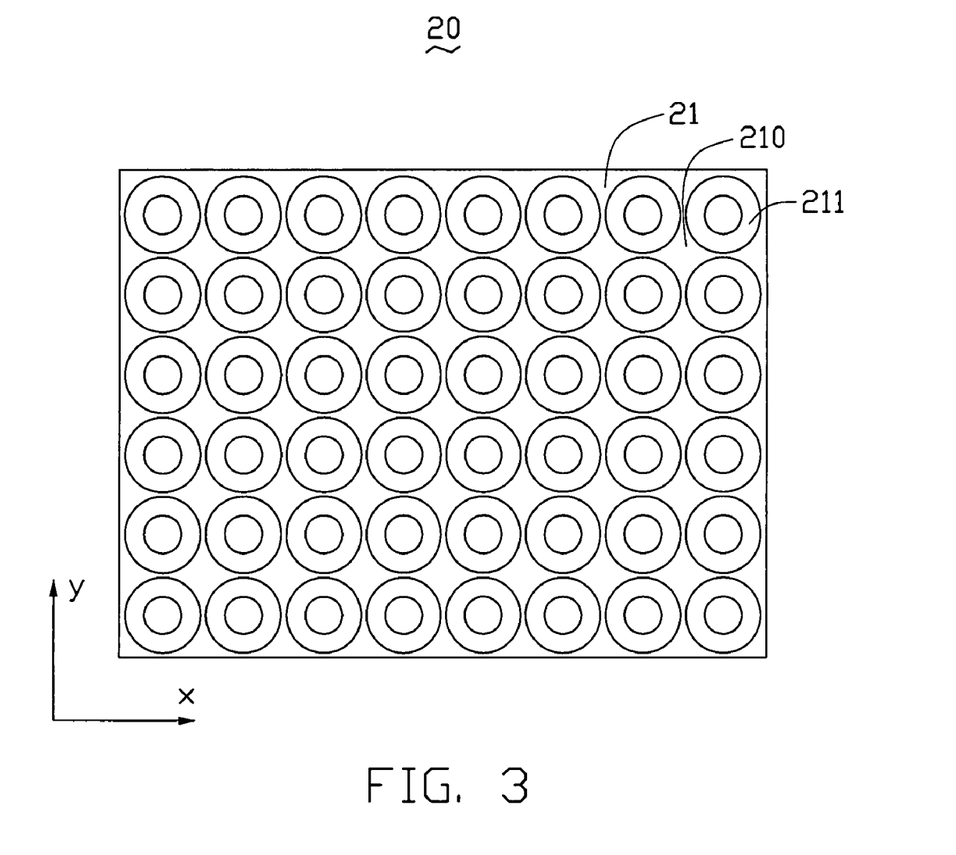
FIG. 3 is a bottom plan view of the optical plate of FIG. 1.

Referring to FIGS. 1-3, an optical plate 20 according to a first preferred embodiment of the present invention is shown. The optical plate 20 includes a first transparent layer 21, a light diffusion layer 22, and a second transparent layer 23. The first transparent layer 21, the light diffusion layer 22, and the second transparent layer 23 are integrally formed, with the light diffusion layer 22 between the first and second transparent layers 21, 23. The first transparent layer 21 and the light diffusion layer 22 are in immediate contact with each other at a first common interface thereof. Similarly, the second transparent layer 23 and the light diffusion layer 22 are in immediate contact with each other at a second common interface thereof. This kind of unified body with no gaps at the common interfaces can be made by multi-shot injection molding technology. The first transparent layer 21 defines a plurality of first conical frustum-shaped depressions 211 at an outer surface 210 that is distalmost from the second transparent layer 23. The second transparent layer 23 forms a plurality of second conical frustum-shaped depressions 231 at an outer surface 230 that is distalmost from the first transparent layer 21.

A thickness of each of the first transparent layer 21, the light diffusion layer 22, and the second transparent layer 23 may be equal to or greater than 0.35 millimeters (mm). In a preferred embodiment, a combined thickness of the first transparent layer 21, the light diffusion layer 22, and the second transparent layer 23 is in the range from 1.05 mm to about 6 mm. The first and second transparent layers 21, 23 can be made of a transparent matrix resin selected from a group including polyacrylic acid (PAA), polycarbonate (PC), polystyrene (PS), polymethyl methacrylate (PMMA), methylmethacrylate and styrene copolymer (MS), and any suitable combination thereof. It should be noted that a material of the first and second transparent layers 21, 23 may be the same or may be different.

The first conical frustum-shaped depressions 211 are arranged regularly at the outer surface 210, thus forming a first regular matrix. Each first conical frustum-shaped depression 211 abuts all four adjacent first conical frustum-shaped depressions 211. A horizontal width of each first conical frustum-shaped depression 211 increases from a top end of the first conical frustum-shaped depression 211 to a bottom end of the first conical frustum-shaped depression 211. Thus a cross-section taken along an axis of symmetry of the first conical frustum-shaped depression 211 defines an isosceles trapezoid. A pitch $P_1$ between two adjacent first conical frustum-shaped depressions 211 is preferably in the range from about 0.025 mm to about 1.5 mm. A maximum radius $R_1$ of each of the first conical frustum-shaped depressions 211 is preferably in the range from about one quarter of the pitch $P_1$ to about one pitch $P_1$. An angle α defined by an inside surface of each first conical frustum-shaped depression 211 relative to a central axis of the first conical frustum-shaped depression 211 is preferably in the range from about 30 degrees to about 75 degrees.

The second conical frustum-shaped depressions 231 are configured to be similar to the first conical frustum-shaped depressions 211. A pitch $P_2$ between two adjacent second conical frustum-shaped depressions 231 is also preferably in the range from about 0.025 mm to about 1.5 mm. A maximum radius $R_2$ of each of the second conical frustum-shaped depressions 231 is also preferably in the range from about one quarter of the pitch $P_2$ to about one pitch $P_2$. An angle β defined by an inside surface of each second conical frustum-shaped depression 231 relative to a central axis of the second conical frustum-shaped depression 231 is preferably in the range from about 30 degrees to about 75 degrees.

The light diffusion layer 22 includes a transparent matrix resin 221, and a plurality of diffusion particles 222 dispersed in the transparent matrix resin 221. The transparent matrix resin 221 can be made of a material selected from a group including polyacrylic acid (PAA), polycarbonate (PC), polystyrene (PS), polymethyl methacrylate (PMMA), methylmethacrylate and styrene copolymer (MS), and any suitable combination thereof. The diffusion particles 222 can be made of a material selected from a group including titanium dioxide, silicon dioxide, acrylic resin, and any suitable combination thereof. The diffusion particles 222 are configured for scattering light and enhancing the uniformity of light exiting the light diffusion layer 22. The light diffusion layer 22 preferably has a light transmission ratio in the range from 30% to 98%. The light transmission ratio of the light diffusion layer 22 is determined by a composition of the transparent matrix resin 221 and the diffusion particles 222.

Figure 4:
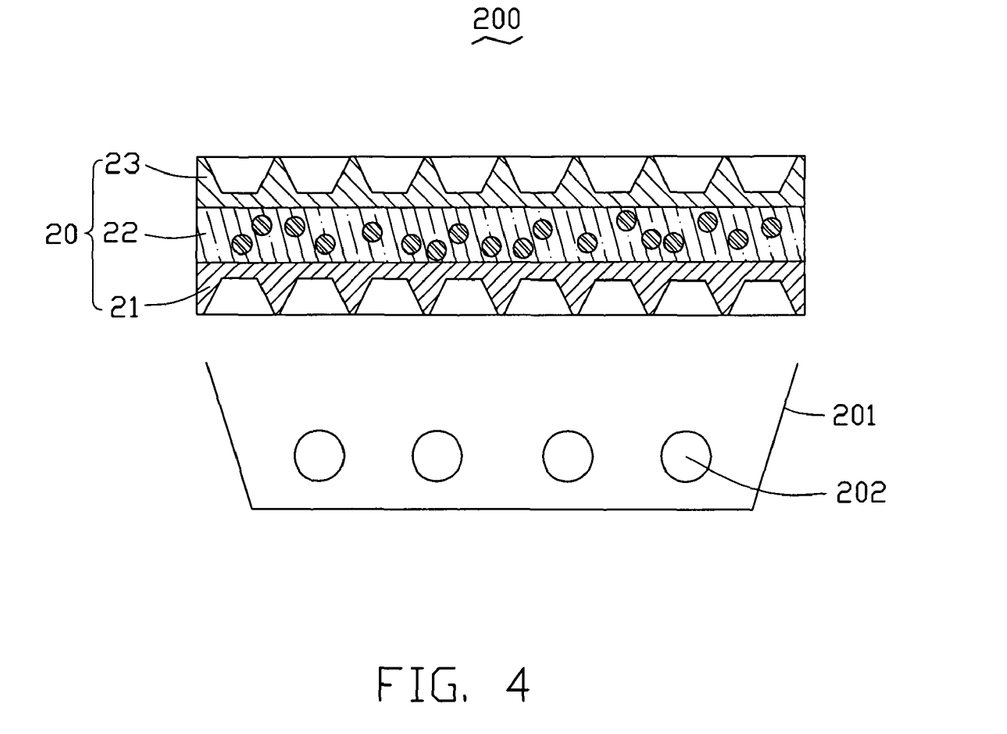
FIG. 4 is a lateral cross-sectional view of a direct type backlight module in accordance with a second embodiment of the present invention, the backlight module including the optical plate shown in FIG. 1.

Referring to FIG. 4, a direct type backlight module 200 according to a second preferred embodiment of the present invention is shown. The backlight module 200 includes a housing 201, a plurality of lamp tubes 202, and the optical plate 20. The lamp tubes 202 are regularly arranged above a base of the housing 201. The optical plate 20 is positioned on top of the housing 201, with the first transparent layer 21 facing the lamp tubes 202. It should be pointed out that in alternative embodiments, the optical plate 20 may be arranged in the direct type backlight module 200 so as to have the second transparent layer 23 facing the lamp tubes 202. That is, the direct type backlight module 200 is configurable to have light from the lamp tubes 202 to either enter the first transparent layer 21 or the second transparent layer 23 of the optical plate 20.

In the direct type backlight module 200, when the light from the lamp tubes 202 enters the optical plate 20 via the first transparent layer 21, the light from the lamp tubes 202 is diffused by the first conical frustum-shaped depressions 211 of the first transparent layer 21. Then the light diffused by the first conical frustum-shaped depressions 211 is substantially further diffused by the light diffusion layer 22 of the optical plate 20. Finally, much of the light is collimated by the second conical frustum-shaped depressions 231 of the second transparent layer 23 before exiting the optical plate 20. As a result, the brightness of the backlight module is increased. In addition, because the light is diffused twice by the optical plate 20, so that the uniformity of light exiting the optical plate 20 is enhanced. Furthermore, because the first transparent layer 21, the light diffusion layer 22, and the second transparent layer 23 are integrally formed together (see above), with no air or gas pockets at the interfaces, the utilization efficiency of light is increased. Moreover, when the optical plate 20 is utilized in a backlight module, the optical plate 20 in effect replaces the conventional combination of a diffusion plate and a prism sheet. Therefore compared with conventional art, a assembly process of the backlight module is simplified and an efficiency of the assembly process is improved. Still further, in general, a space occupied by the optical plate 20 is less than that occupied by the conventional combination of the diffusion plate and the prism sheet. Thus a size of the backlight module can also be reduced.

When light enters the optical plate 20 via the second transparent layer 23, the uniformity of light exiting the optical plate 20 is also enhanced, and the efficiency of utilization of light is also increased. Light exiting the optical plate 20 via the first transparent layer 21 is the same from light exiting the optical plate 20 via the second transparent layer 23.

Figure 5:
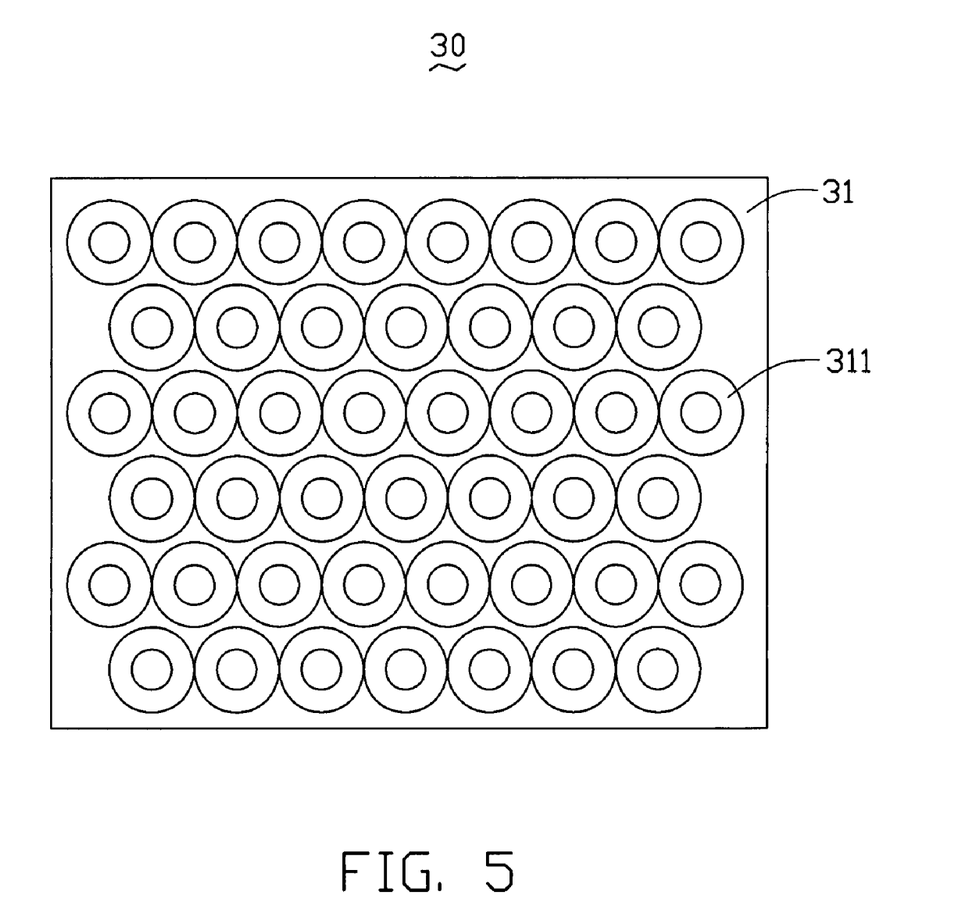
FIG. 5 is a bottom plan view of an optical plate in accordance with a third preferred embodiment of the present invention.

Referring to FIG. 5, an optical plate 30 according to a third preferred embodiment is shown. The optical plate 30 includes a first transparent layer 31 and a plurality of conical frustum-shaped depressions 311. The conical frustum-shaped depressions 311 are regularly defined at the first transparent layer 31 in a series of rows. Adjacent conical frustum-shaped depressions 311 in a same row abut each other. The conical frustum-shaped depressions 311 in a row in relation to the conical frustum-shaped depressions 311 of an adjacent row offset each other correspondingly. Thus a matrix comprised of offset rows of the conical frustum-shaped depressions 311 is formed. Furthermore, the rows are arranged such that the conical frustum-shaped depressions 311 are spaced apart from the conical frustum-shaped depressions 311 of the adjacent rows correspondingly.

Figure 6:
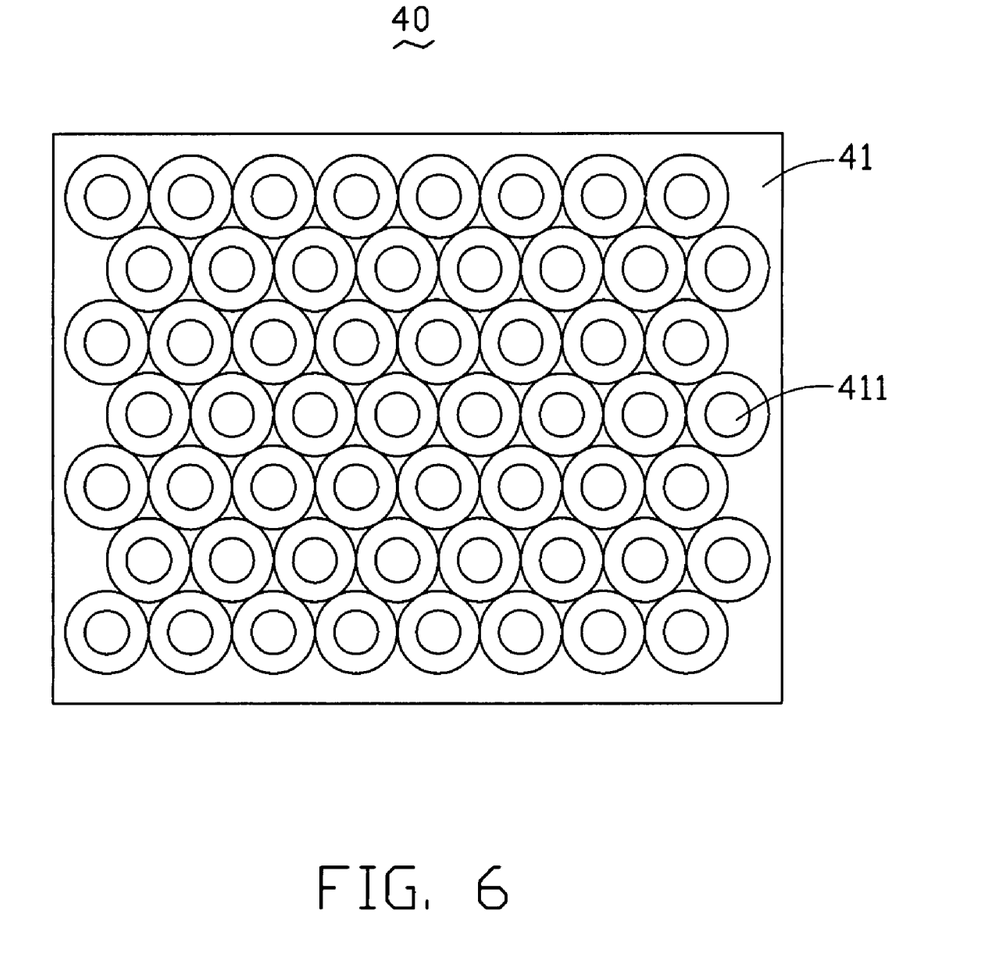
FIG. 6 is a bottom plan view of an optical plate in accordance with a fourth preferred embodiment of the present invention.

Referring to FIG. 6, an optical plate 40 according to a fourth preferred embodiment is shown. The optical plate 40 includes a second transparent layer 41 and a plurality of conical frustum-shaped depressions 411. The conical frustum-shaped depressions 411 are arranged regularly at the second transparent layer 43, and are arranged in offset rows in similar fashion to the conical frustum-shaped depressions 311 of the optical plate 30. However, the offset rows are arranged so that the rows are arranged such that the conical frustum-shaped depressions 411 abut the conical frustum-shaped depressions 411 of the adjacent rows correspondingly. Thus a honeycomb pattern of the conical frustum-shaped depressions 411 is formed. Each conical frustum-shaped depression 411 abuts the adjacent conical frustum-shaped depressions 411 in each adjacent row.

It should be understood that the conical frustum-shaped depressions 211, 311, 411 of the optical plates 20, 30, 40 are not limited to being arranged in a regular matrix. The conical frustum-shaped depressions 211, 311, 411 can alternatively be arranged in other manners. In alternative arrangements, a pitch between any two adjacent conical frustum-shaped depressions 211, 311, 411 is preferred to be in a constant value. In another example, the conical frustum-shaped depressions 211, 311, 411 can be arranged randomly. Similarly, the conical frustum-shaped depressions 231 of the optical plate 20 are not limited to being arranged in a regular matrix. The conical frustum-shaped depressions 231 can alternatively be arranged in other manners. For example, the conical frustum-shaped depressions 231 in each of the rows may be spaced apart from the conical frustum-shaped depressions 231 in each of the adjacent rows. In another example, the conical frustum-shaped depressions 231 may be arranged in a honeycomb pattern.

In the optical plate 20 of the first preferred embodiment, the first interface between the light diffusion layer 22 and the first transparent layer 21 is flat. Similarly, the second interface between the light diffusion layer 22 and the second transparent layer 23 is also flat. Alternatively, the first interface between the light diffusion layer 22 and the first transparent layer 21 may be non-planar. Similarly, the interface between the light diffusion layer 22 and the second transparent layer 23 may also be non-planar. Examples of such non-planar interfaces include curved interfaces such as wavy interfaces.

In these kinds of alternative embodiments, a binding strength between the light diffusion layer 22 and the first transparent layer 21 is increased. Similarly, a binding strength between the light diffusion layer 22 and the second transparent layer 23 is also increased.

Figure 7:
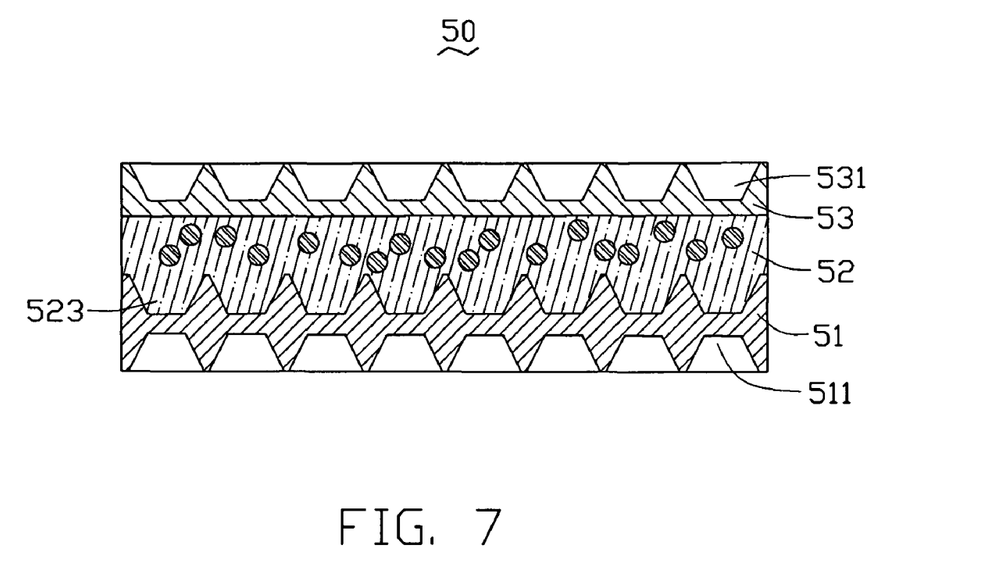
FIG. 7 is a lateral cross-sectional, partially enlarged view of an optical plate in accordance with a fifth preferred embodiment of the present invention.

For example, referring to FIG. 7, an optical plate 50 in accordance with a fifth preferred embodiment is shown. The optical plate 50 is similar to the optical plate 20 of the first preferred embodiment. However, the optical plate 50 includes a first transparent layer 51, a light diffusion layer 52, and a second transparent layer 53 defining a plurality of conical frustum-shaped depressions 531. The light diffusion layer 52 includes a plurality of conical frustum protrusions 523 formed at an interface thereof that adjoins the first transparent layer 51. In alternative embodiments, the conical frustum protrusions 523 may be formed on the first transparent layer 51 instead of on the light diffusion layer 52. In a further alternative embodiment, an interface between the light diffusion layer 52 and the second transparent layer 53 may be non-planar. Such interface can for example be curved. Alternatively, a plurality of conical frustum-shaped depressions may be defined at the interfaces.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An optical plate, comprising:
    a first transparent layer;
    a second transparent layer; and
    a light diffusion layer between the first transparent layer and the second transparent layer, the light diffusion layer including a transparent matrix resin and a plurality of diffusion particles dispersed in the transparent matrix resin;
    wherein the first transparent layer, the light diffusion layer, and the second transparent layer are integrally formed, with the first transparent layer in immediate contact with the light diffusion layer, and the second transparent layer in immediate contact with the light diffusion layer, the first transparent layer defines a plurality of first conical frustum-shaped depressions at an outer surface that is farthest from the light diffusion layer, the second transparent layer defines a plurality of second conical frustum-shaped depressions at an outer surface that is farthest from the light diffusion layer, and the interface between the light diffusion layer and the first transparent layer defines a plurality of micro-recesses having a same shape and arrangement as the plurality of second conical frustum-shaped depressions at the outer surface of the second transparent layer.

2. The optical plate as claimed in claim 1, wherein a thickness of each of the light diffusion layer, the first transparent layer, and the second transparent layer is equal to or greater than 0.35 millimeters.

3. The optical plate as claimed in claim 2, wherein a combined thickness of the light diffusion layer, the first transparent layer, and the second transparent layer is in the range from 1.05 millimeters to 6 millimeters.

4. The optical plate as claimed in claim 1, wherein each of the first and second transparent layers is made of a material selected from a group consisting of polyacrylic acid, polycarbonate, polystyrene, polymethyl methacrylate, methylmethacrylate and styrene copolymer, and any combination thereof.

5. The optical plate as claimed in claim 1, wherein a pitch between two first conical frustum-shaped depressions is in the range from 0.025 mm to 1.5 mm.

6. The optical plate as claimed in claim 5, wherein a maximum radius of each first conical frustum-shaped depression is in the range from about one quarter of the pitch between two adjacent first conical frustum-shaped depressions to about one pitch between two first conical frustum-shaped depressions and an angle defined by an inside surface of each first conical frustum-shaped depression relative to a central axis of the first conical frustum-shaped depression is in the range from 30 degrees to 75 degrees.

7. The optical plate as claimed in claim 1, wherein the first conical frustum-shaped depressions are defined at the outer surface of the first transparent layer in a regular matrix.

8. The optical plate as claimed in claim 1, wherein the first conical frustum-shaped depressions are defined at the outer surface of the second transparent layer in rows, and the first conical frustum-shaped depressions in a row in relation to the conical frustum-shaped depressions of an adjacent row offset each other correspondingly.

9. The optical plate as claimed in claim 1, wherein the first conical frustum-shaped depressions are defined at the outer surface of the second transparent layer in a honeycomb pattern.

10. The optical plate as claimed in claim 1, wherein a pitch between two second conical frustum-shaped depressions is in the range from 0.025 mm to 1.5 mm.

11. The optical plate as claimed in claim 10, wherein a maximum radius of each second conical frustum-shaped depression is in the range from about one quarter of the pitch between two adjacent second conical frustum-shaped depressions to about one pitch between two second conical frustum-shaped depressions, and an angle defined by an inside surface of each second conical frustum-shaped depression relative to a central axis of the second conical frustum-shaped depression is in the range from 30 degrees to 75 degrees.

12. The optical plate as claimed in claim 1, wherein the second conical frustum-shaped depressions are defined at the outer surface of the second transparent layer in a regular matrix.

13. The optical plate as claimed in claim 1, wherein the second conical frustum-shaped depressions are defined at the outer surface of the second transparent layer in rows, and the second conical frustum-shaped depressions in a row in relation to the conical frustum-shaped depressions of an adjacent row offset each other correspondingly.

14. The optical plate as claimed in claim 1, wherein the second conical frustum-shaped depressions are defined at the outer surface of the second transparent layer in a honeycomb pattern.

15. The optical plate as claimed in claim 1, wherein the transparent matrix resin of the diffusion layer is made of a material selected from a group consisting of polyacrylic acid, polycarbonate, polystyrene, polymethyl methacrylate, methylmethacrylate and styrene copolymer (MS), and any combination thereof, and a material of the diffusion particles is selected from a group consisting of titanium dioxide, silicon dioxide, acrylic resin, and any combination thereof.

16. A direct type backlight module, comprising:
a housing;
a plurality of light sources disposed on or above a base of the housing; and
an optical plate, comprising:
a first transparent layer;
a second transparent layer; and
a light diffusion layer between the first transparent layer and the second transparent layer, the light diffusion layer including a transparent matrix resin and a plurality of diffusion particles dispersed in the transparent matrix resin;
wherein the first transparent layer, the light diffusion layer, and the second transparent layer are integrally formed, with the first transparent layer in immediate contact with the light diffusion layer, and the second transparent layer in immediate contact with the light diffusion layer, the first transparent layer defines a plurality of first conical frustum-shaped depressions at an outer surface that is farthest from the light diffusion layer, the second transparent layer defines a plurality of second conical frustum-shaped depressions at an outer surface that is farthest from the light diffusion layer, and the interface between the light diffusion layer and the first transparent layer defines a plurality of micro-recesses having a same shape and arrangement as the plurality of second conical frustum-shaped depressions at the outer surface of the second transparent layer.

17. The direct type backlight module as claimed in claim 16, wherein a selected one of the first transparent layer and the second transparent layer of the optical plate is arranged to face the light sources, wherein light from the light sources enters the optical plate via the corresponding first transparent layer or second transparent layer.

* * * * *